(12) United States Patent
Dixon III et al.

(10) Patent No.: US 6,944,851 B1
(45) Date of Patent: Sep. 13, 2005

(54) METHOD AND SYSTEM FOR EXECUTING A COMPUTER PROGRAM

(75) Inventors: Walter Dixon III, Delanson, NY (US); Brian J. Murren, Clifton Park, NY (US)

(73) Assignee: General Electric Capital Corporation, Stamford, CT (US)

( * ) Notice: Subject to any disclaimer, the term of this patent is extended or adjusted under 35 U.S.C. 154(b) by 582 days.

(21) Appl. No.: 09/681,567

(22) Filed: Apr. 30, 2001

(51) Int. Cl.[7] .................................................. G06F 9/45
(52) U.S. Cl. ........................................ 717/136; 717/108
(58) Field of Search ................................ 719/310–320; 709/200–203; 715/130–131, 505–508; 717/106–109, 136–137, 124, 127

(56) References Cited

U.S. PATENT DOCUMENTS

| | | | | |
|---|---|---|---|---|
| 4,992,971 A | * | 2/1991 | Hayashi ..................... 717/140 |
| 5,257,363 A | * | 10/1993 | Shapiro et al. .............. 703/13 |
| 5,355,493 A | * | 10/1994 | Silberbauer et al. ........ 717/136 |
| 5,428,554 A | * | 6/1995 | Laskoski ..................... 714/38 |
| 5,497,500 A | * | 3/1996 | Rogers et al. .............. 717/109 |
| 5,519,855 A | * | 5/1996 | Neeman et al. ................ 707/3 |
| 5,535,390 A | * | 7/1996 | Hildebrandt ................ 711/154 |
| 5,572,671 A | * | 11/1996 | Eisenberg et al. ............. 714/47 |
| 5,826,065 A | * | 10/1998 | Hinsberg et al. ............. 717/104 |
| 5,872,977 A | * | 2/1999 | Thompson .................. 717/122 |
| 5,960,441 A | * | 9/1999 | Bland et al. ............. 707/104.1 |
| 6,012,149 A | * | 1/2000 | Stavran ......................... 714/2 |
| 6,032,198 A | * | 2/2000 | Fujii et al. .................. 719/328 |
| 6,038,565 A | * | 3/2000 | Nock ......................... 707/101 |
| 6,226,783 B1 | * | 5/2001 | Limondin et al. .......... 717/104 |
| 6,243,862 B1 | * | 6/2001 | Lebow ....................... 717/131 |
| 6,564,325 B1 | * | 5/2003 | Travostino et al. ......... 713/200 |
| 6,636,855 B2 | * | 10/2003 | Holloway et al. ............ 707/10 |

OTHER PUBLICATIONS

"Sams Teach Yourself Visual Basic 6 in 21 Days" by Greg Perry, Sams, 1998.*
"Understanding JavaServer Pages Model 2 Architecture", by Govind Seshadri, Dec. 1999.*
"What is ASP?" by Dave Beauchemin, Apr. 12, 2000.*

* cited by examiner

*Primary Examiner*—St. John Courtenay, III
(74) *Attorney, Agent, or Firm*—Buckley, Maschoff & Talwalkar LLC

(57) ABSTRACT

A method and system for executing programs. The execution system executes a program with interactions. Each interaction has one or more commands that each have one or more attributes and a behavior. The execution system identifies interaction of the program to be performed and performs the commands of each indentified interaction. For each command of an identified interaction, the execution system identifies the input attributes based on the values of output attributes of a previously performs command of an interaction of the program. The execution then performs the command to generate values of output attributes of the command in accordance with the behavior of the command.

32 Claims, 14 Drawing Sheets

METHOD AND SYSTEM FOR EXECUTING A COMPUTER PROGRAM

BACKGROUND OF INVENTION

The described technology relates generally to executing a computer program and particularly to executing an application program that is defined by interactions.

Computer programs are traditionally developed by the writing of source code for components of the program that include a main module and various other modules functions, or subroutines that are invoked by the main module. The source code of components of computer programs are typically developed specifically for the domain of one computer program. As a result, one computer program might not be able to use components developed specifically for another computer program. Although some utility components (e.g., sort routines) can be reused by different computer programs, they are typically very low-level components that are not related to the domain of the computer program. Because of the inability to reuse high-level components for multiple computer programs, the cost of developing a computer program can be quite high. In addition, because new components are developed for each new computer program, the reliability of the new computer programs is unproved.

Many techniques have been developed to facilitate the reusability and reliability of software components. One well-known technique is object-oriented programming. Object-oriented programming allows a programmer to define a type of component, known as an "object." Each type of object has a defined interface with a defined behavior. A programmer can develop a computer program to use the interfaces of objects that have been developed by other programmers to provide that behavior within the computer program. The behavior of an object is provided by methods (or member functions), and the data of an object is provided as attributes (or data members). Some object-oriented programming languages allow attributes to be set and retrieved directly (e.g., "object.attribute 1 32 15"), while other object-oriented programming languages only allow attributes to be set and retrieved indirectly through methods (e.g., "object.setAttribute 1 (15)"). The methods for setting attributes are referred to as "set methods" and for retrieving attributes are referred to as "get methods." Although object-oriented programming techniques have helped increase the reusability and reliability of software components, it is still very expensive to develop a computer program even using these reusable components. Part of the expense is attributable to the need of computer programmers to know and understand all the interfaces of the components in order to integrate the components into the desired computer program. It would be desirable to have a programming technique that would increase reusability and reliability of the software components while reducing the overall expense of developing computer programs.

DETAILED DESCRIPTION

Figure 1:
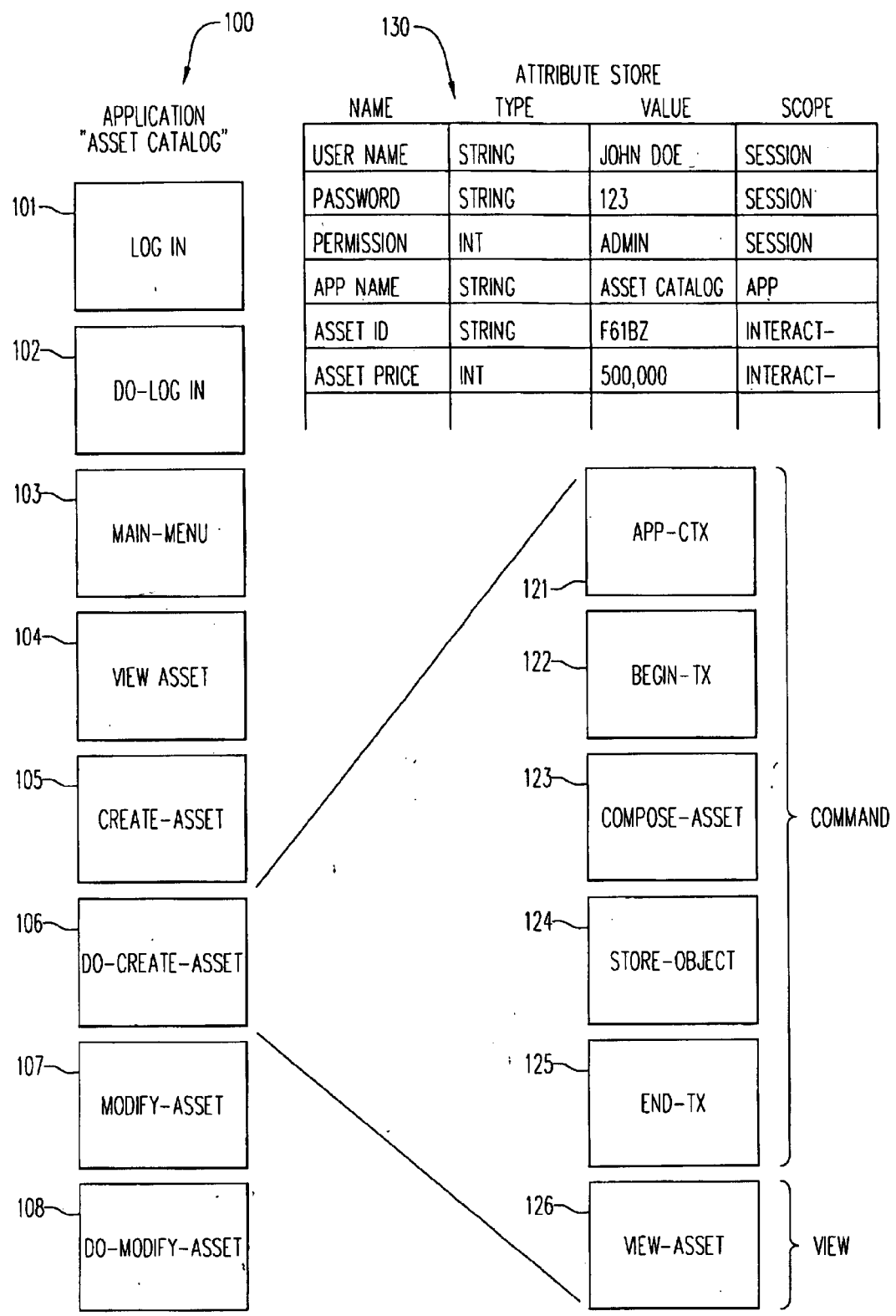
FIG. 1 is a block diagram illustrating an application program and attribute store of the execution system.

[RD-29098/Application.doc]-3-Apr. 26, 2001 A method and system for executing a computer program is provided. In one embodiment, the execution system executes a computer program defined by interactions. Each interaction has one or more commands that each have one or more attributes and a behavior. The execution system identifies interactions of the computer program to be performed and performs the commands of each identified interaction. For each command of an identified interaction, the execution system identifies the input attributes of the command. The execution system then sets the values of the identified input attributes based on the values of output attributes of a previously performed command of an interaction of the computer program. The execution system then performs the command to generate values of output attributes of the command in accordance with the behavior of the command. More generally, the techniques of the execution system can be used at compile time of a program to automatically generate source code from a list of names of functions. In the compile-time embodiment, the system may identify the formal parameters of each function and output source code invocations of each function in the list. The invocation would specify the actual parameters, which may have the same names as the formal parameters. In this way, a programmer does not need to specify mappings of actual parameters to formal parameters of functions of a computer program. Rather, the system performs those mappings either dynamically at run time or statistically at compile time.

The execution system uses interaction-based definitions of the computer programs that it executes. Each computer program is defined by a series of zero or more interaction definitions that are based on a request-response model. Each interaction definition may include command definitions and view definitions. A command definition defines a command whose functionality may be represented by an object that has various attributes and that provides the behavior of that command. A view definition defines a view that provides a response to a request. Each interaction of a computer program is associated with a certain type of request. When the execution system receives a request, it identifies the associated interaction and then performs the behavior of the commands defined by that interaction. The execution system automatically instantiates an object associated with each command defined in a command definition. Prior to performing the behavior of a command, the execution system prepares the instantiated object by identifying each of the input attributes of that object (e.g., by retrieving the class definition of the object) and setting the input attributes (e.g., by invoking set methods) of the object based on the current value of the attributes in an attribute store. After setting the attribute values, the execution system performs the behavior of the object (e.g., by invoking a perform method of the object). After the behavior is performed, the execution system extracts the output attributes of the object by retrieving the values of the output attributes (e.g., by invoking get methods of the object) and storing those retrieved values in the attribute store. Thus, the attribute store stores the values of output attributes of each object which are then available to set the input attributes of other objects. In one embodiment, the execution system serially performs the instatiation, preparation, performance, and extraction for each command. One skilled in the art would appreciate that in certain instances the execution of commands can be in parallel depending on the data dependencies of the commands. Because the execution system automatically prepares an object based on the current values in the attribute store and extracts attribute values after performing the behavior of the object, a programmer does not need to explicitly specify the invocation of methods of objects (e.g., "object.setAttribute1(15)") when developing a computer program to be executed by the execution system. In an alternate embodiment, the execution system may initially instantiate all the objects of each interaction of a computer program. Whenever an object is performed as part of an interaction, the execution system extracts the output attributes of that object by retrieving the values of the output attributes and setting the input attributes of all of the instantiated objects that correspond to the output attributes. In this way, the execution system does not need to use an attribute store.

FIG. 1 is a block diagram illustrating an application program and attribute store of the execution system. Sample application 100 allows the user to view, create, and modify information relating to assets (e.g., products) that are stored in an electronic catalog. The name of the application is "asset catalog." The application comprises eight interactions: login 101, do-login 102, main-menu 103, view-asset 104, create-asset 105, do-create-asset 106, modify-asset 107, and do-modify-asset 108. When the execution system receives a request (e.g., do-create-asset), it invokes the corresponding interaction of the application to perform the behavior and returns a view so that subsequent requests of the application can be made. Each interaction is defined by a series of zero or more command definitions and a view definition. Each command definition defines a command (e.g., object class) that provides a certain behavior. The do-create-asset interaction includes five command definitions: app-ctx 121, begin-tx 122, compose-asset 123, store-object 124, and end-tx 125. The do-create-asset interaction is invoked after a user specified the values of the attributes of a new asset to be added to the asset catalog. The app-ctx command retrieves the current application context of the application. The application context may be used by the interaction to access certain application-wide information, such as user profile settings. The begin-tx command indicates that a transaction for the asset catalog is beginning. The compose-asset command creates an object that identifies the value of the attributes of the asset to be added to the asset catalog. The store-object command stores an entry identified by the created object in the asset catalog. The end-tx command indicates that the transaction for the asset catalog is ending. The interaction also includes a view definition 126 that identifies that a view named "view-asset" is to be invoked to prepare a response (e.g., display page) to return to the user. The attribute store 130 contains an entry for each attribute that has been defined by an interaction of the application that has been invoked. The attribute store identifies the name of the attribute, the type of the attribute, the scope of the attribute, and the current value of the attribute. For example, the last entry in the attribute store has the name of "assetPrice," the type of "integer," the value of "500 000," and the scope of "interaction." The scope of an attribute indicates the life of the attribute. An attribute with the scope of interaction (also known as "request") has a life only within the interaction in which it is defined. An attribute with the scope of session has a life only within the current session (e.g., logon session) of the application. An attribute with the scope of application has life across executions of the application. When the execution system receives a do-create-asset request, it invokes the do-create-asset interaction. The execution system first instantiates the app-ctx object defined in the interaction, prepares the object by setting its attributes based on the current values of the attribute store, performs the behavior of the object by invoking a perform method of the object, and extracts the attribute values of the object by getting the attribute values and storing them in the attribute store. The execution system then instantiates the begin-tx object defined by the interaction, prepares the object by setting its attribute values based on the current values of the attribute store, performs the behavior of the object by invoking a perform method of the object, and extracts the attribute values of the object by getting the attribute values and storing them in the attribute store. The execution system repeats this process for the compose-asset object, the store-object object, and the end-tx object. The execution system then invokes the view-asset, which in this example may be a Java server page ("JSP") that retrieves the values of the attributes of the asset from the attribute store and provides a display page showing those attribute values.

Figure 2:
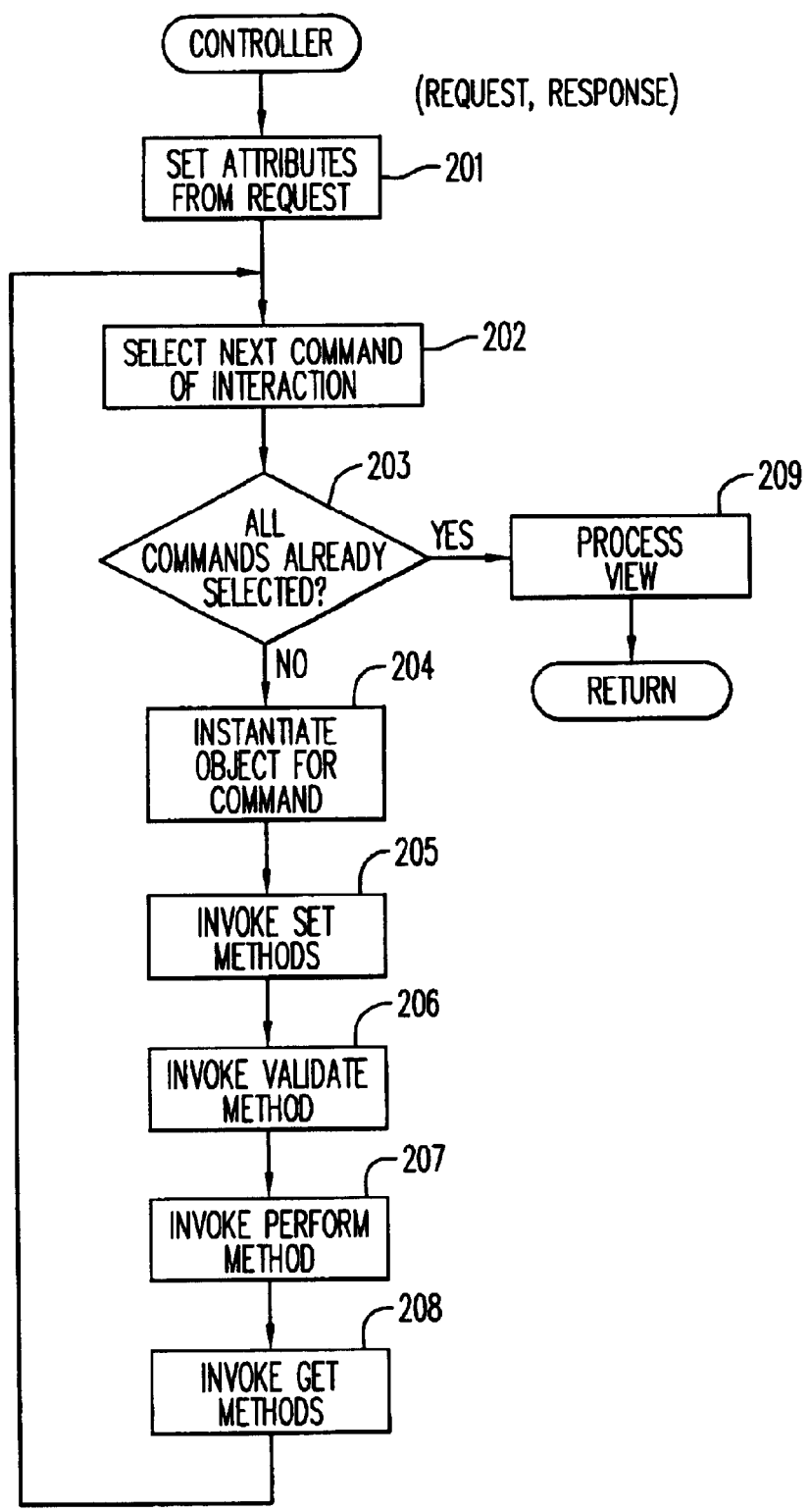
FIG. 2 is a flow diagram illustrating the overall processing of a controller component of the execution system.

FIG. 2 is a flow diagram illustrating the overall processing of a controller component of the execution system. The controller is invoked to process a request and return a response (e.g., display page). The execution system may be used by a server system in a client/server environment, such as the World Wide Web. The WWW uses a request-response model in which HTTP-request messages are sent by client systems to server systems. The server systems respond with HTTP-response messages, which may define web pages (e.g., HTML document) that are to be displayed to users at the client systems. In block 201, the controller sets the values of the attributes that are identified in the passed request in the attribute store. For example, a view-asset request may include the value for an "assetID" attribute that uniquely identifies an asset that is currently stored in the asset catalog. The request may be in the form of an HTTP-request message with the attributes specified as parameters. In blocks 202–208, the controller loops processing each command of the interaction associated with the passed request. In block 202, the controller selects the next command of the interaction associated with the passed request, starting with the first command. In decision block 203, if all the commands have already been selected, then the controller continues at block 209, else the controller continues at block 204. In block 204, the controller instantiates an object associated with the selected command. The object class associated with the command is specified in the command definition of the interaction. In block 205, the controller prepares the object by retrieving the values of the input attributes of the object from the attribute store and invoking the set methods of the object to set the values of the input attributes. In block 206, the controller invokes a validate method of the object to determine whether the current values of the input attributes of the object will allow the behavior of the object to be performed correctly. If the validate method indicates that the behavior cannot be performed correctly, then the controller generates an exception and skips further processing of the commands of the interaction. In block 207, the controller invokes the perform method of the object to perform the behavior of the object. In block 208, the controller extracts the values of the output attributes of the object by invoking the get methods of the object and then setting the values of the corresponding attributes in the attribute store. The controller then loops to block 202 to select the next command of the interaction. In block 209, the controller processes the view defined in the view definition of the interaction and then returns the response provided by the view.

Figure 3:
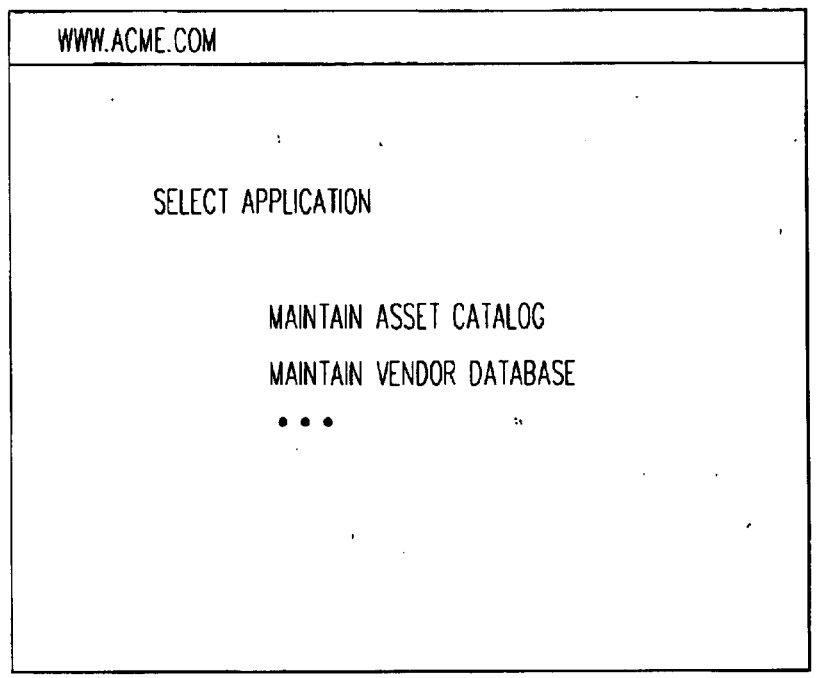
FIG. 3 illustrates a web page that allows the user to select an application program to execute.

FIGS. 3–6 are display pages illustrating the interaction between a user and an application program. These display pages are displayed at a client system by a web browser. In this example, the application is web-based and the display pages are web pages (e.g., HTML documents). FIG. 3 illustrates a web page that allows the user to select an application to execute. In this example, the user can select the application identified as "maintain asset catalog" or the application identified as "maintain vendor database." As indicated by the ellipsis, the user may be provided with many other applications to select. When the user selects an application, an HTTP-request message is sent from the client system to the server system of the web site. The request message identifies the application and a login interaction. When the execution system at the server system receives the request for the application and the login interaction, it invokes the controller to perform the login interaction of the identified application. The login interaction prepares a web page to return to the client system.

Figure 4:
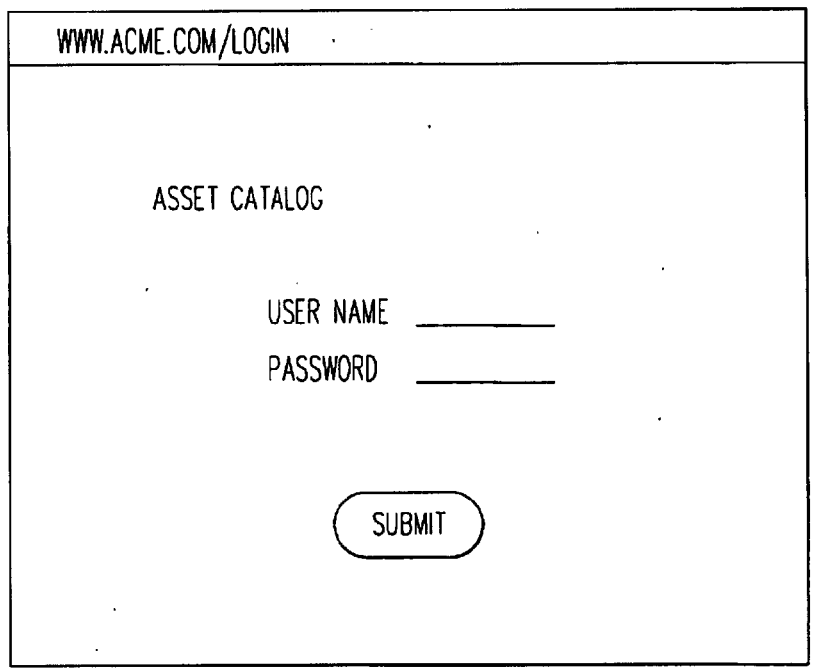
FIG. 4 illustrates a web page that is provided by the logon interaction of the asset catalog application.
Figures 5, 6:
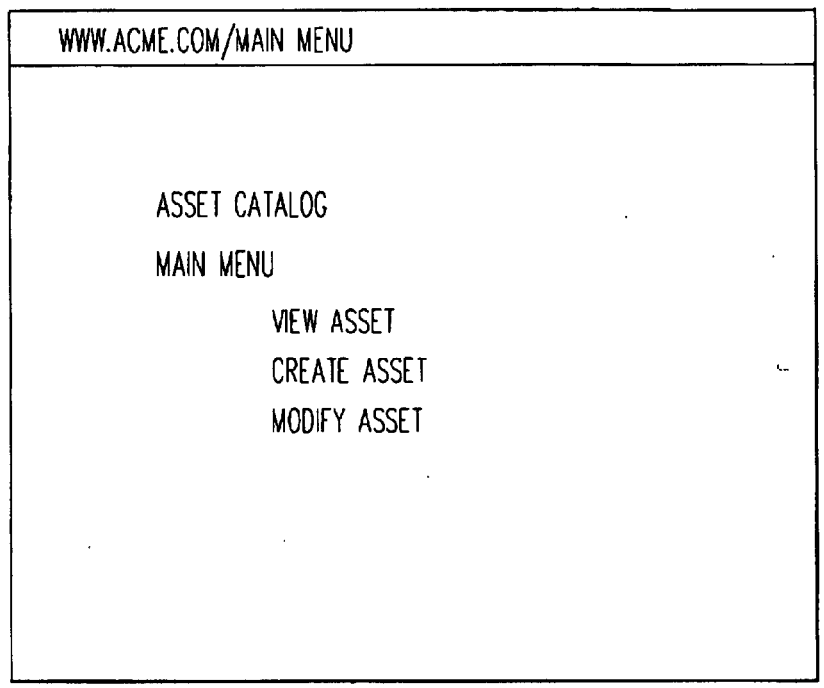
FIG. 5 illustrates a web page that specifies the menu items of the asset catalog application.
FIG. 6 illustrates a web page that is provided by the create-asset interaction of the asset catalog application.

FIG. 4 illustrates a web page for logging in that is provided by the login interaction of the maintain asset catalog application. This web page prompts the user to enter their username and password and to select the submit button. When the submit button is selected, an HTTP-request message is sent that identifies the asset catalog application, the do-login interaction, and the user name and password. When the execution system receives the request, it invokes the controller to perform the do-login interaction of the asset catalog application. The do-login interaction prepares a web page to return to the client system. FIG. 5 illustrates a web page that specifies the menu items of the asset catalog application, which is provided by the do-login interaction. In this example, the menu items are view asset, create asset, and modify asset. When the user selects the create asset menu item, an HTTP-request message is sent that identifies the asset catalog application and the create asset interaction. When the execution system receives the request, it invokes the controller to perform the create-asset interaction of the asset catalog application. That interaction prepares a web page for entry of the attributes of an asset.

FIG. 6 illustrates a web page for entry of asset attributes that is provided by the create-asset interaction of the asset catalog application. The web page provides various fields for the user to specify various attributes of an asset. When the user selects the create asset button, an HTTP-request message is sent that identifies the asset catalog application, the do-create-asset interaction, and the attribute values entered by the user into the web page. When the execution system receives the request, it invokes the controller to perform the do-create-asset interaction to effect the creation of an asset catalog entry for the specified asset with the attribute values entered by the user.

In one embodiment, the interactions of an application are specified in an XML ("Extensible Markup Language") file. (One skilled in the art will appreciate that the information defining interactions may be stored in various formats, such as being stored in a relational database.) Table 1 contains the document type definition ("DTD") for an application program in one embodiment. The document type definition specifies in the syntax of the XML file that defines an application by specifying the tags of the XML file and their associated attributes. Lines 1–4 define the application tag, which is the root tag of the XML file. The application tag can include translator, command, view, and interaction tags, which are described below. The application tag includes a name attribute that specifies the name of the application.

Lines 6–11 define the translator tag. A translator is an object that provides a prepare method and an extract method for processing an object instantiated by the execution system to perform a command. Each command may specify the translator that is to be used for that command. If the command does not specify a translator, then a default translator is used. The name attribute of the translator tag is a logical name used by a command tag to specify the translator for that command. The class attribute of the translator tag identifies the class for the translator object. The default attribute of the translator tag indicates whether this translator is the default translator that is used when a command does not specify a translator.

Lines 13–16 define the translator-ref tag. The translator-ref tag is used in a command tag to refer back to the translator to be used with the command. The name attribute of the translator-ref tag identifies the name of the translator to be used by the command.

Lines 18–22 define the command tag. A command tag may include translator-ref tags and attribute tags. The translator-ref tag specifies the name of the translator to be used by this command. The attribute tags specify information relating to attributes of the command. The name attribute of the command tag provides the name of the command, which is used by the command-ref tag to refer to the command. The class attribute of the command tag provides the name of the object class that implements the behavior of the command. In an alternate embodiment, the command tag may have an optional perform-name attribute that provides the name of the method of the object to perform the behavior of the command, rather than using a method with a predefined name, such as "service" or "perform." The name of the method could also be specified using an attribute of the command-ref tag described below.

Lines 24–28 define the command-ref tag. The command-ref tag is used by the interaction tag to specify the commands within the interaction. The command reference tag may include attribute tags. The name attribute of the command-ref tag specifies the logical name of the command as specified in a command tag. The type attribute of the command-ref tag specifies whether the command should be performed even if an exception occurs earlier in the interaction. The value of "finally" means that the command should be performed.

Lines 30–37 define an attribute tag. The attribute tag defines how attributes of a command are processed. The name attribute of the attribute tag specifies the name of an attribute. The value attribute of the attribute tag specifies a value for the attribute. That value is to be used when the command is invoked to override the current value for that attribute in the attribute store. The get-name attribute of the attribute tag specifies an alternate name for the attribute when getting an attribute value from the attribute store. The set-name attribute of the attribute tag specifies an alternate name for the attribute when setting an attribute value in the attribute store. The get-name and set-name attributes effectively implement an aliasing mechanism for attribute names. The scope attribute of the attribute tag specifies whether the scope of the attribute is application, request (or interaction), or session.

Lines 39–45 define a view tag. A view tag defines a view. The name attribute of the view tag specifies the name of the view, which is used by the view-ref tag to refer to a view. The target attribute of a view tag specifies the JSP target of a view. The type attribute of the view tag specifies whether the view should be invoked when there is an error. The default attribute of the view taq specifies whether this view is the default view that is used when an interaction does not explicitly specify a view.

Lines 47–50 define the view-ref tag. The view-ref tags are included in interaction tags to specify that the associated view is to be included in the interaction. The name attribute of the view-ref tag specifies the name of the referenced view as indicated in a view tag.

Lines 52–55 define tags used for conditional analysis of commands or views. A conditional tag may include an if tag, an else if tag, an else tag, a command-ref tag, a view-ref tag, and a conditional tag. The data of the if tag and the else if tag specify a condition (e.g., based on attribute values in the attribute store) that specify the commands or view that are to be conditionally performed when executing an interaction.

Lines 57–60 define the interaction tag. An interaction tag defines a sequence of command, view, or conditional tags that define an interaction. The interaction tag may include command-ref, view-ref and conditional tags. The name attribute of the interaction tag identifies the name of the interaction, which is used to identify the interaction to invoke when a request is received. The requests specify the name of the interaction.

TABLE 1

1. <!ELEMENT application
   (translator*,command*,view*,interaction*)>
2. <!ATTLIST application
3. name ID #REQUIRED
4. >
5.
6. <!ELEMENT translator EMPTY>
7. <!ATTLIST translator
8. name ID #REQUIRED
9. class CDATA #REQUIRED
10. default (true|false) "false"
11. >

TABLE 1-continued 12.
13. <!ELEMENT translator-ref EMPTY>
14. <!ATTLIST translator-ref
15. name IDREF #REQUIRED
16. >
17.
18. <!ELEMENT command (translator-ref*, attribute*)>
19. <!ATTLIST command
20. name ID #REQUIRED
21. class CDATA #REQUIRED
22. >
23.
24. <!ELEMENT command-ref (attribute*)>
25. <!ATTLIST command-ref
26. name IDREF #REQUIRED
27. type (default|finally) "default"
28. >
29.
30. <!ELEMENT attribute EMPTY>
31. <!ATTLIST attribute
32. name ID #REQUIRED
33. value CDATA #IMPLIED
34. get-name CDATA #IMPLIED
35. set-name CDATA #IMPLIED
36. scope (application|request|session) "request"
37. >
38.
39. <!ELEMENT view>
40. <!ATTLIST view
41. name ID #REQUIRED
42. target CDATA #REQUIRED
43. type (default|error) "default"
44. default (true|false) "false"
45. >
46.
47. <!ELEMENT view-ref>
48. <!ATTLIST view-ref
49. name IDREF #REQUIRED
50. >
51.
52. <!ELEMENT if (#PCDATA)>
53. <!ELEMENT elsif (#PCDATA)>
54. <!ELEMENT else EMPTY>
55. <!ELEMENT conditional (if?, elsif*, else*, command-ref*, view-ref*, conditional*)>
56.
57. !ELEMENT interaction (command-ref*,view-ref*,conditional*)>
58. <!ATTLIST interaction
59. name ID #REQUIRED
60. >

Table 2 provides an example XML file that defines an application. The application is the asset catalog application described above. Line 1 includes an application tag with the name of the application. Lines 2–3specify the default translator for the application. Lines 5–11 define the various commands associated with the application. For example, as indicated by line 7, the command named "login" is associated with the class "demo.cb.Login." Whenever a login command is performed, an object of class "demo.cb.Login" is used to provide the behavior. Lines 13–20 define the views of the application. For example, line 14 illustrates that the view named "view-asset" is invoked by invoking the target named "html/view-asset.jsp." Lines 23–98 define the various interactions that compose the application. For example, lines 42–53 define the "view-asset " interaction. The interaction includes command-ref tags for each command defined in the interaction. The conditional tag at lines 47–52 defines a conditional view. In this example, if the user has administrator permission, then the "view-asset-admin" view is invoked, else the "view-asset" view is invoked. Lines 88–90 illustrate the use of an attribute tag used within a command tag. The attribute tag indicates that the attribute named "object" that is an input attribute of the command corresponds to the attribute named "asset" in the attribute store.

TABLE 2

1. <application name="asset catalog">
2. <translator name="default-trans" class="com.ge.dialect.cb.DefaultTranslator"
3. default="true"/>
4.
5. <command name="app-ctx" class="demo.cb.AppCtx"/>
6. <command name="begin-tx" class="demo.cb.BeginTx"/>
7. <command name="login" class="demo.cb.Login"/>
8. <command name="load-asset" class="demo.cb.LoadAsset"/>
9. <command name="compose-asset" class="demo.cb.ComposeAsset"/>
10. <command name="store-object" class="demo.cb.StoreObject"/>
11. <command name="end-tx" class="demo.cb.EndTx"/>
12.
13. <view name="error-view" target="html/error.jsp" type="error" default="true"/>
14. <view name="view-asset" target="html/view-asset.jsp"/>
15. <view name="view-asset-admin" target="html/view-asset-admin.jsp"/
16. <view name="create-asset" target="html/create-asset.jsp"/>
17. <view name="modify-asset" target="html/modify-asset.jsp/>
18. <view name="login" target="html/login.jsp"/>
19. <view name="login-error" target="html/login.jsp" type="error"/>
20. <view name="main-menu" target="html/main-menu.jsp"/>
21.
22.
23. <interaction name="login">
24. <view-ref name="login"/>
25. </interaction>
26.
27. <interaction name="do-login">
28. <command-ref name="app-ctx"/>
29. <command-ref name="begin-tx"/>
30. <command-ref name="login">
31. <attribute name="loginUser" scope="session"/>
32. </command-ref>
33. <command-ref name="end-tx" type="finally"/>
34. <view-ref name="main-menu"/>
35. <view-ref name="login-error"/>
36. </interaction>
37.
38. <interaction name="main-menu">
39. <view-ref name="main-menu"/>
40. </interaction>
41.
42. <interaction name="view-asset">
43. <command-ref name="app-ctx"/>
44. <command-ref name="begin-tx"/>
45. <command-ref name="load-asset"/>
46. <command-ref name="end-tx" type="finally"/>
47. <conditional>
48. <if>(loginUser != void) && loginUser.hasPermission ("admin")</if>
49. <view-ref name="view-asset-admin"/>
50. <else/>
51. <view-ref name="view-asset"/>
52. </conditional>
53. </interaction>
54.
55. <interaction name="create-asset">
56. <view-ref name="create-asset"/>
57. </interaction>
58.
59. <interaction name="do-create-asset">
60. <command-ref name="app-ctx"/>
61. <command-ref name="begin-tx"/>
62. <command-ref name="compose-asset"/>
63. <command-ref name="store-object">
64. <command-ref name="object" get-name="asset"/>
65. </command-ref>
66. <command-ref name="end-tx" type="finally"/>
67. <conditional>
68. <if>(loginUser != void) && loginUser.hasPermission ("admin")</if>
69. <view-ref name="view-asset-admin"/>
70. <else/>

TABLE 2-continued

71. <view-ref name="view-asset"/>
72. </conditional>
73. </interaction>
74.
75. <interaction name="modify-asset">
76. <command-ref name="app-ctx"/>
77. <command-ref name="begin-tx"/>
78. <command-ref name="load-asset"/>
79. <command-ref name="end-tx" type="finally"/>
80. <view-ref name="modify-asset"/>
81. </interaction>
82.
83. <interaction name="do-modify-asset">
84. <command-ref name="app-ctx/>
85. <command-ref name="begin-tx"/>
86. <command-ref name="load-asset"/>
87. <command-ref name="compose-asset"/>
88. <command-ref name="store-object">
89. <attribute name="object" get-name="asset"/>
90. </command-ref>
91. <command-ref name="end-tx" type="finally"/>
92. <conditional>
93. <if>(loginUser != void) && loginUser.hasPermission ("admin")</if>
94. <view-ref name="view-asset-admin"/>
95. <else/>
96. <view-ref name="view-asset"/>
97. </conditional>
98. </interaction>
99.
100. </application>

Figure 7:
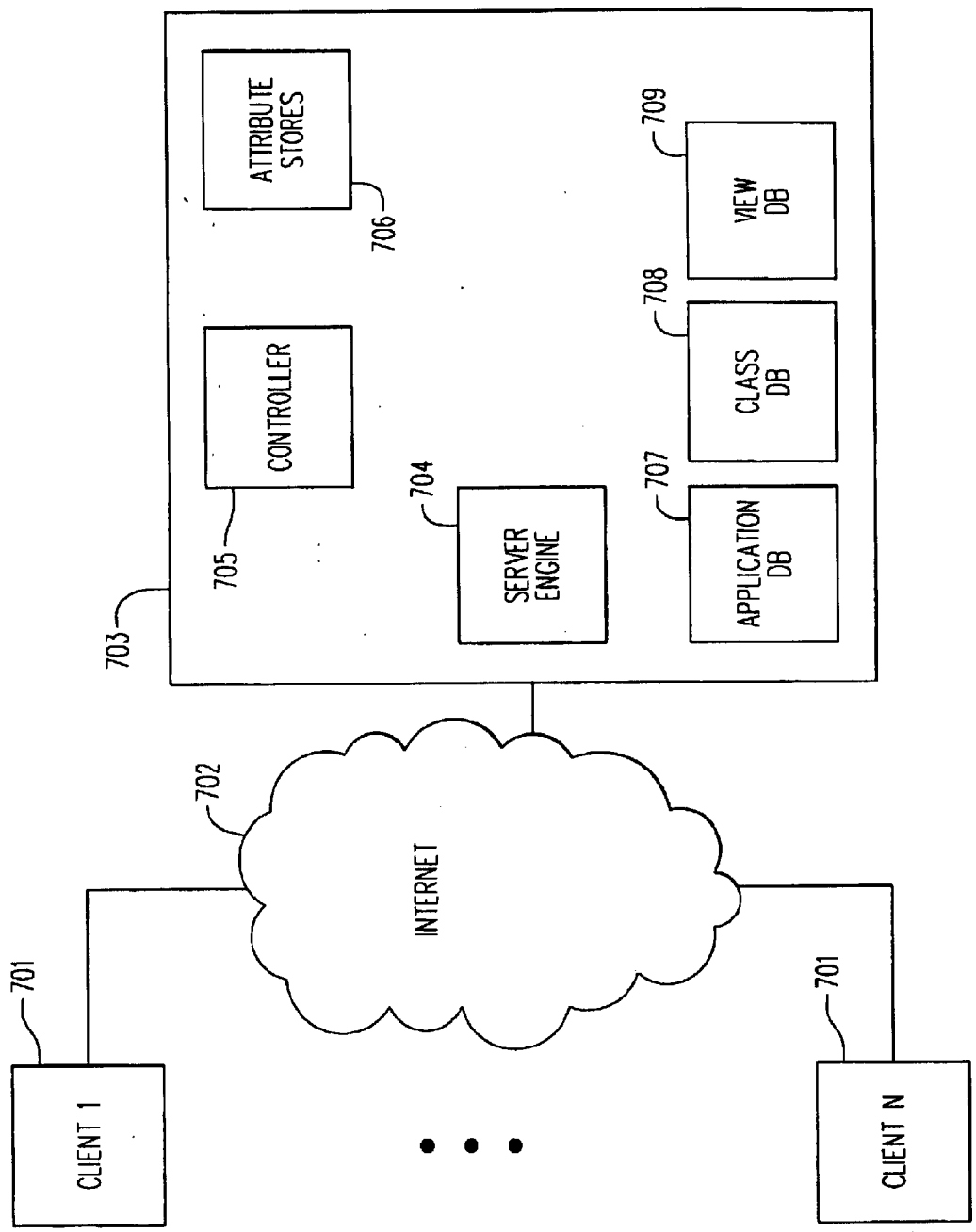
FIG. 7 is a block diagram illustrating the components of the execution system in one embodiment.

FIG. 7 is a block diagram illustrating the components of the execution system in one embodiment. The client computers 701 and the server computer 703 are interconnected via the Internet 702. The computers may include a central processing unit, memory, input devices (e.g., keyboard and pointing device), output devices (e.g., display devices), and storage devices (e.g., disk drives). The memory and storage devices are computer-readable media that may contain computer instructions that implement the execution system. Computer-readable media may also include a data transmission mechanism such as one used to transmit a communications signal. The client computers may use a browser to access web pages of the server computer via the Internet, and the server computer 703 Implements an embodiment of the execution system. The server computer includes a server engine 704, controller 705, attribute store 706, application database 707, class database 708, and view database 709. The server engine receives requests for resources (e.g., web pages) from client computers via the Internet, and coordinates the generation and transmission of the resources by passing the request to the controller component and receiving the response from the controller component. The attribute store contains the current values of the attributes for the application programs. The application database contains an entry, for each application, that defines each of the interactions of the application. The class database contains the class definitions of the objects associated with the commands of the interactions of the applications. The view database contains the JSP's defined by the interactions of the applications. The controller component upon receiving a request, retrieves the application definition from the application database and executes the requested interaction. The execution of the requested interaction uses the class database, the view database, and the attribute store to perform the behaviors associated with the commands and views of interaction.

One skilled in the art will appreciate that the concepts of the execution system can be used in various environments other than the Internet. In particular, various communication channels other than the Internet may be used such as a local area network, a wide area network, or a point-to-point dial-up connection. Also, various request-response models, other than HTTP, such as the Wireless Application Protocol ("WAP") or the Java Messaging Service ("JMS"), may be used. The server computer systems may comprise any combination of hardware and software that can support the execution system. For example, a web server may actually include multiple computers. A client computer system may comprise any combination of hardware and software that interacts with the server systems.

Figure 8:
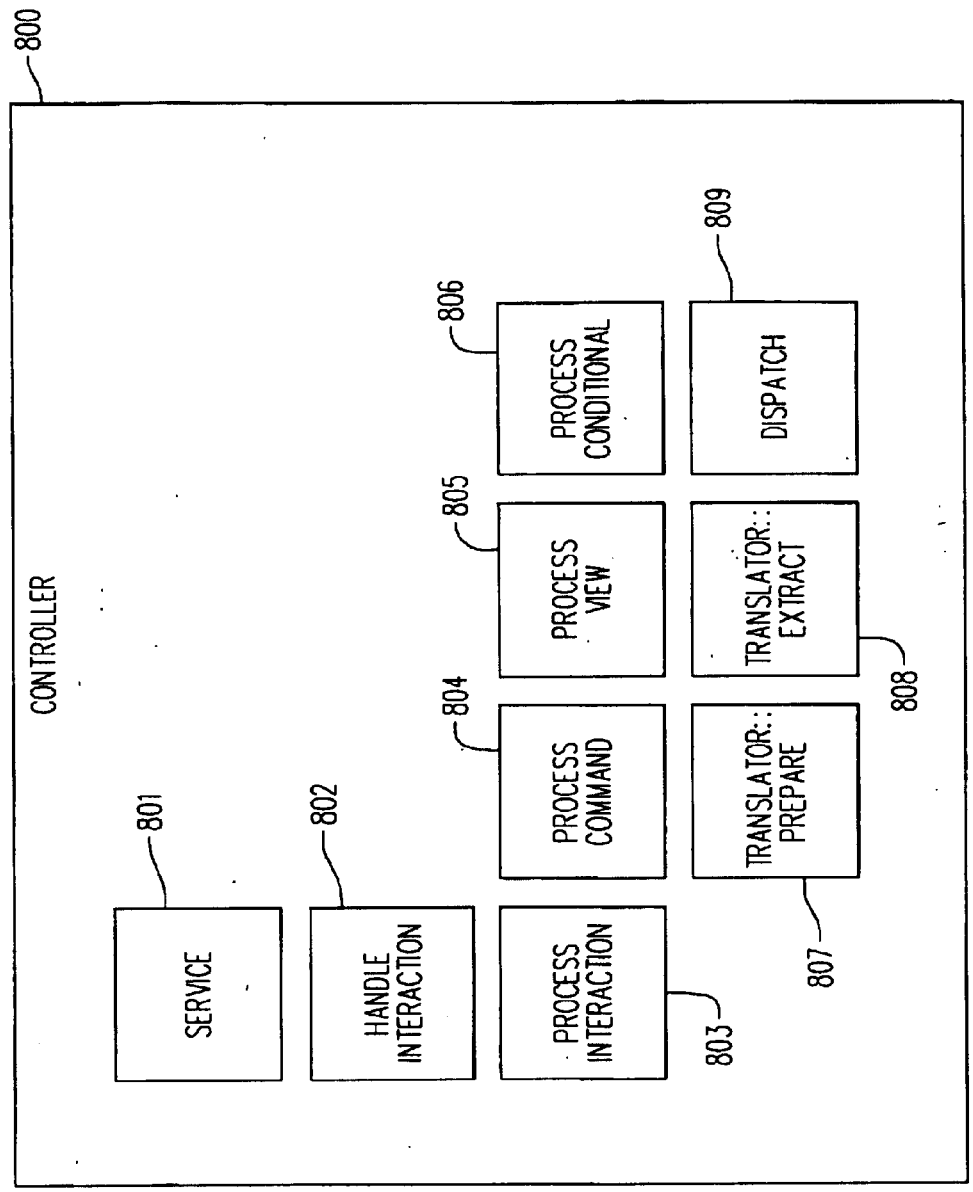
FIG. 8 is a block diagram illustrating components of the controller in one embodiment.

FIG. 8 is a block diagram illustrating components of the controller in one embodiment. The controller 800 includes a service component 801, a handle interaction component 802, a process interaction component 803, a process command component 804, a process view component 805, a process conditional component 806, a translator prepare component 807, a translator extract component 808, and a dispatch component 809. The service component is invoked via the controller to service a request message. The service component stores the value of any attributes specified in the request in the attribute store and invokes the handle interaction component. The handle interaction component retrieves the interaction definition from the application database for the interaction specified in the request and invokes the process interaction component. The process interaction component processes each command and view of the interaction and returns a response. The process command component is invoked by the process interaction component to process each command of the interaction. The process view component is invoked by the process interaction component to process each view of the interaction. The process conditional component is invoked by the process interaction component to process each conditional of the interaction. The process command component invokes the translator prepare component to prepare the object of a command for invocation. The process command component invokes the translator extract component to extract the attributes of the object of the command. The process view component invokes a dispatch component to dispatch a request to the appropriate JSP.

Figure 9:
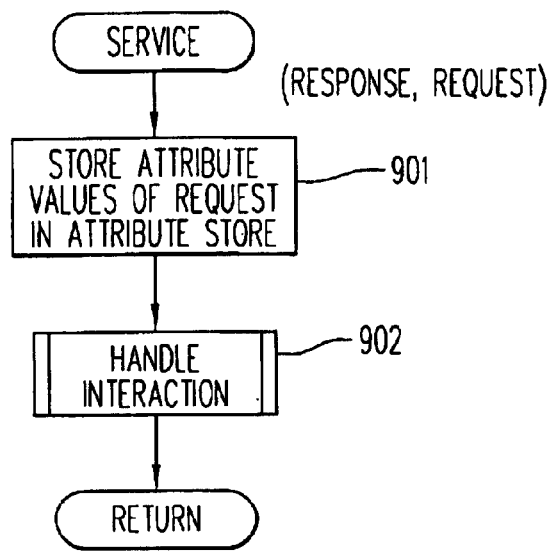
FIG. 9 is a flow diagram illustrating the processing of the service component in one embodiment.

FIG. 9 is a flow diagram illustrating the processing of the service component in one embodiment. The service component is passed a request and returns a response. The service component may be invoked by the server engine. In decision block 901, the component stores attribute values specified in the request into the attribute store. For example, the component may set the current value of a URL attribute as indicated by the request. In block 902, the component invokes the handle interaction component passing the request and receiving a response in return. The component then returns the response, which is sent by the server engine to the client system.

Figure 10:
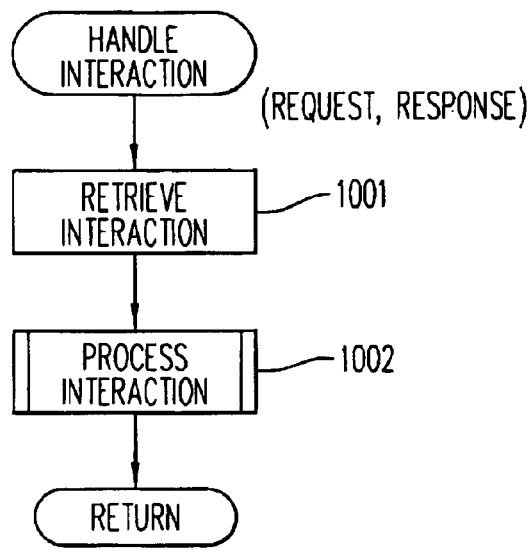
FIG. 10 is a flow diagram illustrating the processing of the handle interaction component in one embodiment.

FIG. 10 is a flow diagram illustrating the processing of the handle interaction component in one embodiment. This component is passed the request and returns a response. In block 1001, the component retrieves the interaction definition from the interaction database. The interaction is specified in the passed request. In block 1002, the component invokes the process interaction component passing the request, response, and indication of the interaction. The component then returns.

Figure 11:
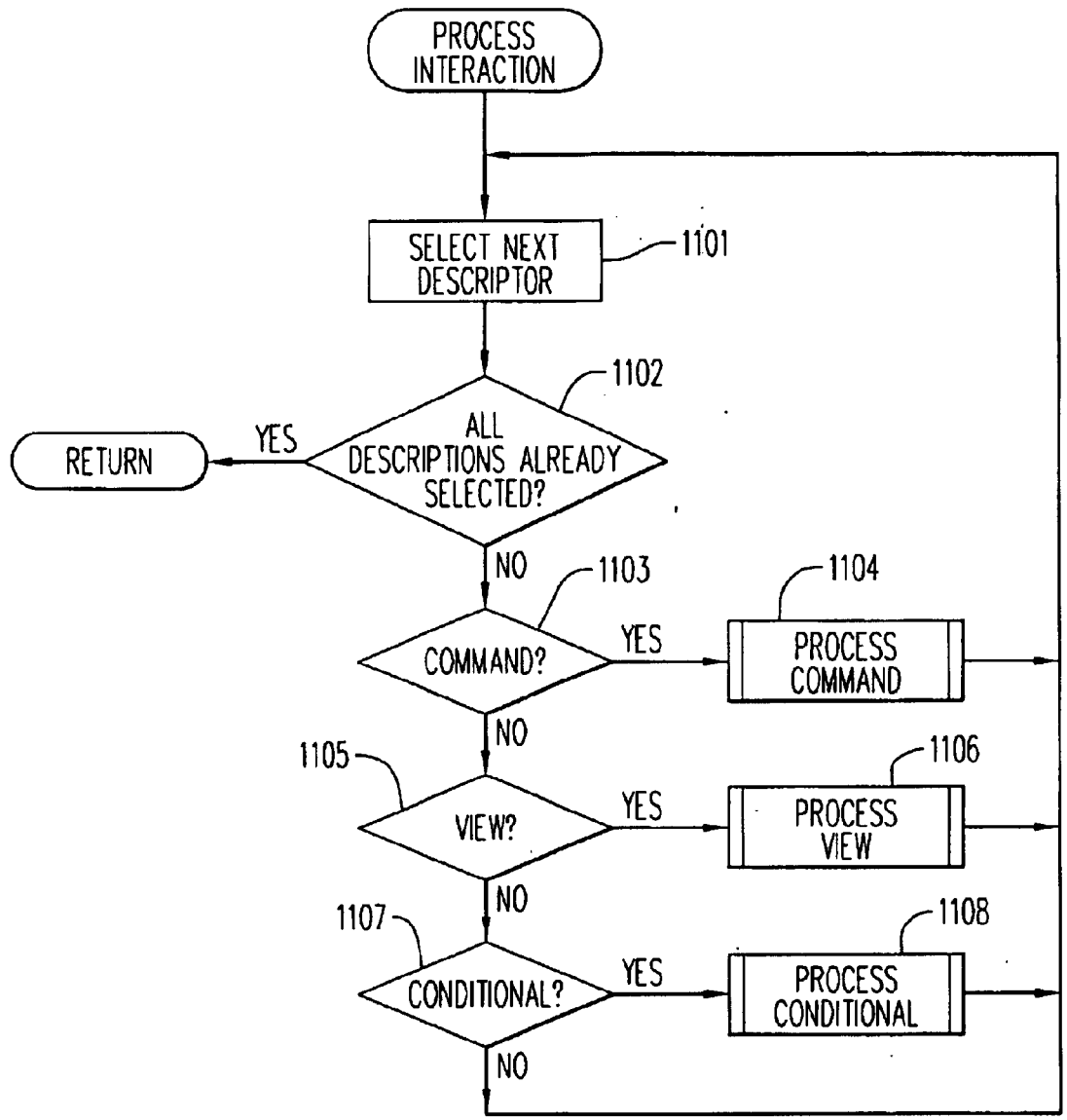
FIG. 11 is a flow diagram illustrating the processing of the process interaction component in one embodiment.

FIG. 11 is a flow diagram illustrating the processing of the process interaction component in one embodiment. This component is passed a request and an interaction definition and returns a response. The component loops processing each descriptor (i.e., command, view, or conditional) specified in the interaction. In block 1101, the component selects the next descriptor of the interaction, starting with the first. In decision block 1102, if all the descriptors of the interaction have already been selected, then the component returns, else the component continues at block 1103. In blocks 1103–1108, the component identifies the descriptor and invokes the appropriate component for processing. In decision block 1103, if the selected descriptor is a command, then the component continues at block 1104, else the component continues at block 1105. In block 1104, the component invokes the process command component and then loops to block 1101 to select the next descriptor. In decision block 1105, if the selected descriptor is a view, then the component continues at block 1106, else the component continues at block 1107. In block 1106, the component invokes the process view component and then loops to block 1101 to select the next descriptor. In decision block 1107, if the selected descriptor is a conditional, then the component continues at block 1108. In block 1108, the component invokes the process conditional component. The component then loops to block 1101 to select the next descriptor.

Figure 12:
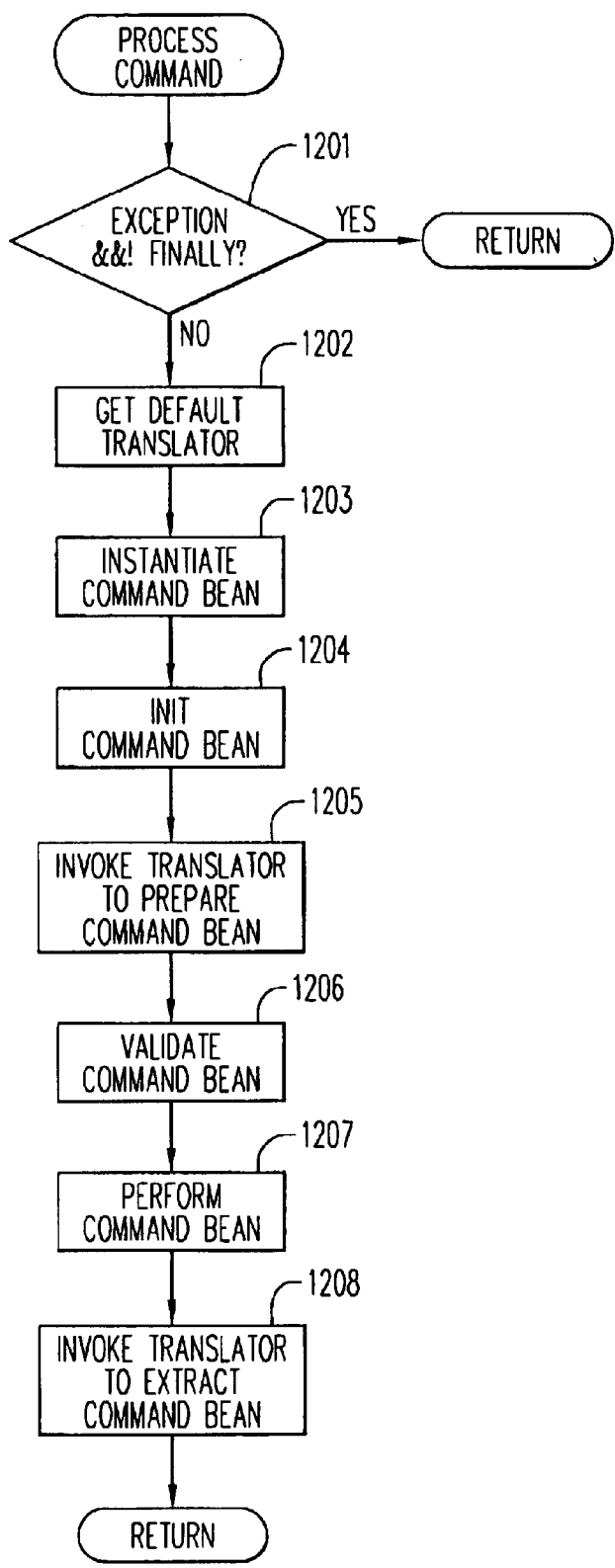
FIG. 12 is a flow diagram illustrating the processing of the process command component in one embodiment.

FIG. 12 is a flow diagram illustrating the processing of the process command component in one embodiment. The process command component is invoked to process a passed command. In decision block 1201, if an exception has been generated during the processing of the interaction and the command is not designated as "finally," then the component returns, else the component continues at block 1202. In block 1202, the component retrieves a translator for the command. The translator may be a default translator or a custom translator specified in the command definition. In block 1203, the component instantiates the object (e.g., in the Java environment a "Java bean") for the command. In block 1204, the component initializes the instantiated object by invoking initialization method of the object. In block 1205, the component invokes the translator passing the instantiated object to prepare the object for performing its behavior. In block 1206, the component validates the object by invoking the validate method of the object. If the validate method returns an error, then an exception may be generated. In block 1207, the component performs the behavior of the object by invoking the perform method of the object. In block 1208, the component invokes the translator passing the object to extract the attribute values of the object and store the current attribute values in the attribute store. The component then returns.

Figure 13:
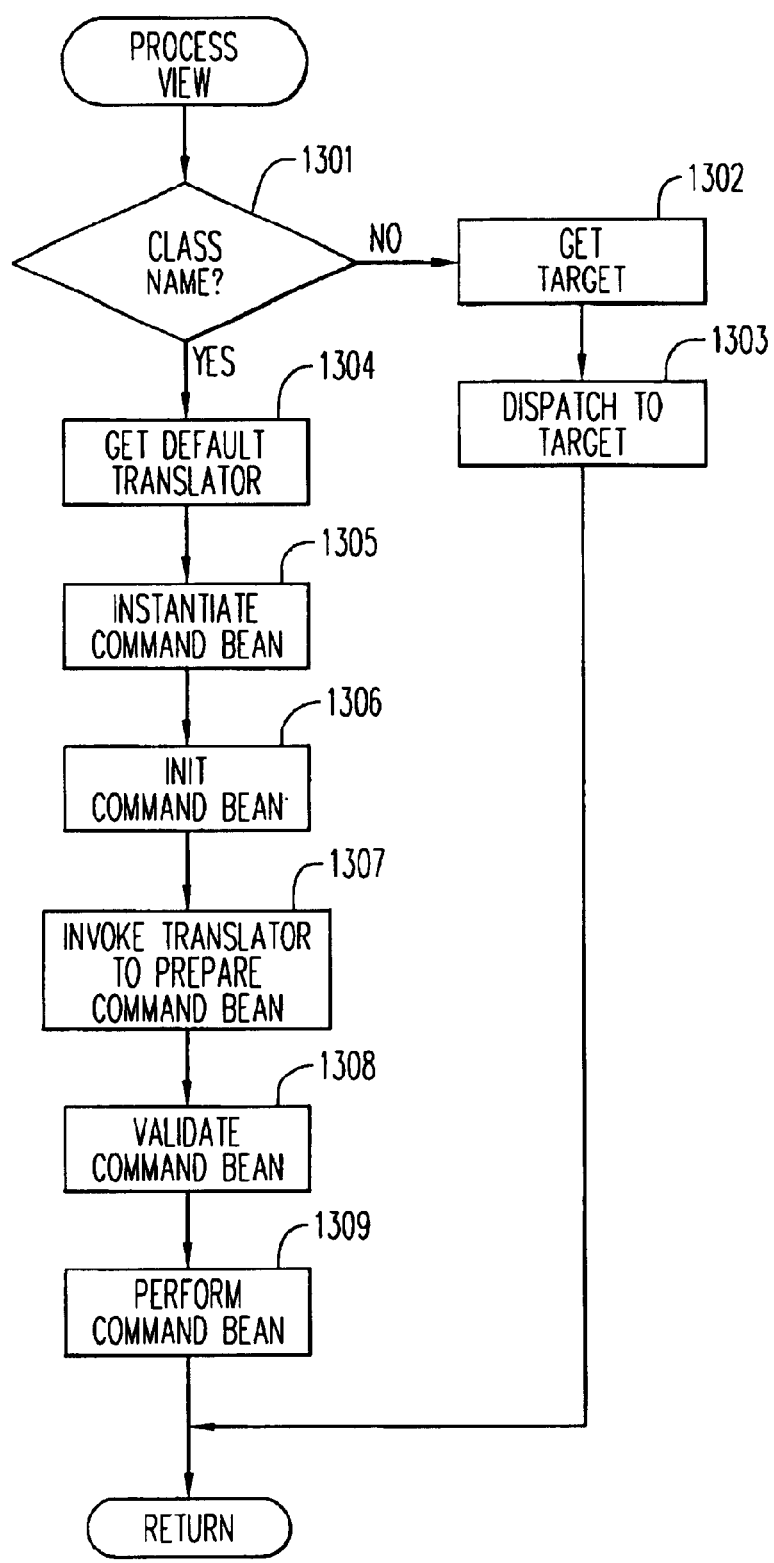
FIG. 13 is a flow diagram illustrating the processing of the process view component in one embodiment.

FIG. 13 is a flow diagram illustrating the processing of the process view component in one embodiment. The component either invokes a target (e.g., JSP) or invokes the behavior of an object that it instantiates. (The specification of the object to be instantiated for a view is not defined by the DTD of Table 1.) In decision block 1301, if a class name is specified in the definition of the view, then the component performs the behavior of an object that it instantiates and continues at block 1304, else the component continues at block 1302. In blocks 1302–1303, the component dispatches the view request to a target specified in the view definition. In block 1302, the component retrieves the target specified in the view definition. In block 1303, the component dispatches the view request to the retrieved target and then returns. In block 1304, the component retrieves a translator for the view. In block 1305, the component instantiates an object of the type specified in the view definition. In block 1306, the component initializes the object by invoking the initialize method of the object. In block 1307, the component invokes the translator passing the object to prepare the object by setting the values of the attributes of the object based on the attribute store. In block 1308, the component validates the object by invoking the validate method of the object. In block 1309, the component performs the behavior of the object by invoking the perform method of the object. The component then returns.

Figure 14:
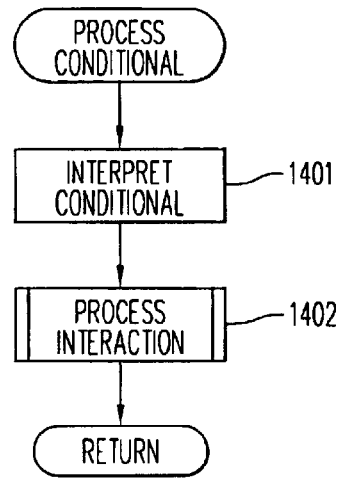
FIG. 14 is a flow diagram illustrating the processing of the process conditional component in one embodiment.

FIG. 14 is a flow diagram illustrating the processing of the process conditional component in one embodiment. The process conditional component interprets a condition and then recursively invokes the process interaction component to process the descriptors (command, view, or conditional) associated with the condition. In block 1401, the component interprets the condition to identify the descriptor that should be processed. The component may interpret the condition based on the current values of the attributes in the attribute store. In block 1402, the component invokes the process interaction component to process the descriptors specified by the condition. The component then returns.

Figure 15:
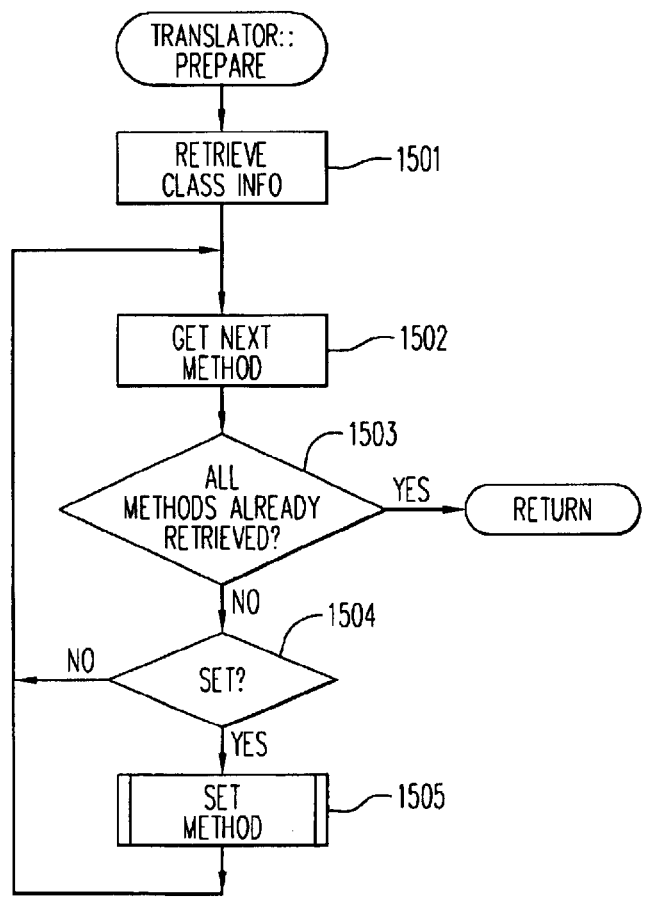
FIG. 15 is a flow diagram illustrating the processing of the set method component of the translator in one embodiment.

FIG. 15 is a flow diagram illustrating the processing of the prepare component of the translator in one embodiment. The prepare component sets the attribute values of the passed object based on the current attribute values in the attribute store. The component identifies the set methods of the object based on the class definition of the object. In block 1501, the method retrieves the class definition for the passed object. The class definitions can be retrieved from the class database or retrieved through a method provided by the object itself. In blocks 1502–1505, the component loops determining whether each method is a set method and then sets the attribute associated with the set methods. In block 1502, the component retrieves the next method specified in the class definition. In decision block 1503, if all the methods have already been selected, then the component returns, else the component continues at block 1504. In decision block 1504, if the selected method is a set method, then the component continues at block 1505, else the component loops to block 1502 to select the next method. (Set methods may be identified by having the name "setxxx," where xxx is the name of the attribute to be set.) In block 1505, the component invokes the set method component of the translator to set the attribute associated with the selected method and then loops to block 1502 to select the next method.

Figure 16:
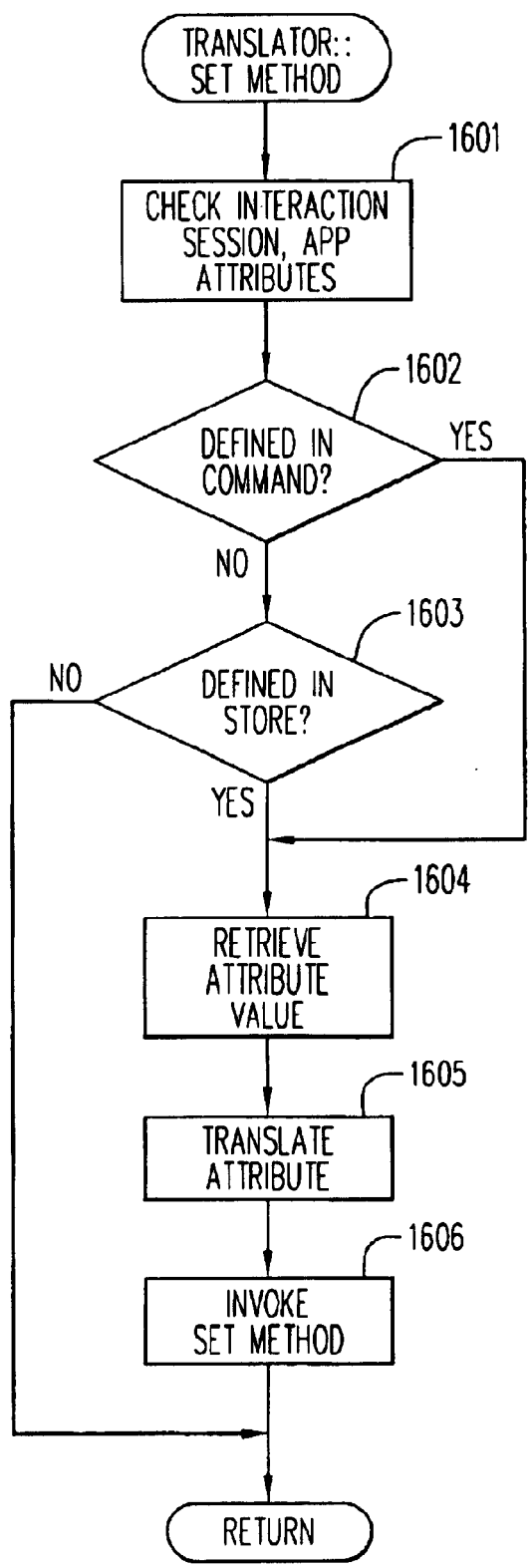
FIG. 16 is a flow diagram illustrating the processing of the set method component of the translator in one embodiment.

FIG. 16 is a flow diagram illustrating the processing of the set method component of the translator in one embodiment. The set method component is invoked to set the value of the attribute associated with a set method of the object. In block 1601, the component determines whether a current value for the attribute of the set method is defined by checking the attribute store. In decision block 1602. If a value for the attribute is specified in the command definition, then the component continues at block 1604, else the component continues at block 1603. In decision block 1603, if the current value of the attribute is defined in the attribute store, then the component continues at block 1604, else the component returns because no value is currently defined for that attribute. In block 1604, the component retrieves the attribute value from the command definition or the attribute store, giving priority to the command definition and then from narrowest to broadest scope (i.e., interaction, session, and then application). In block 1605, the component performs any necessary translation of the attribute value, such as converting an integer representation of the number to a string representation. In block 1606, the component invokes the set method of the object passing the translated attribute value and then returns.

Figure 17:
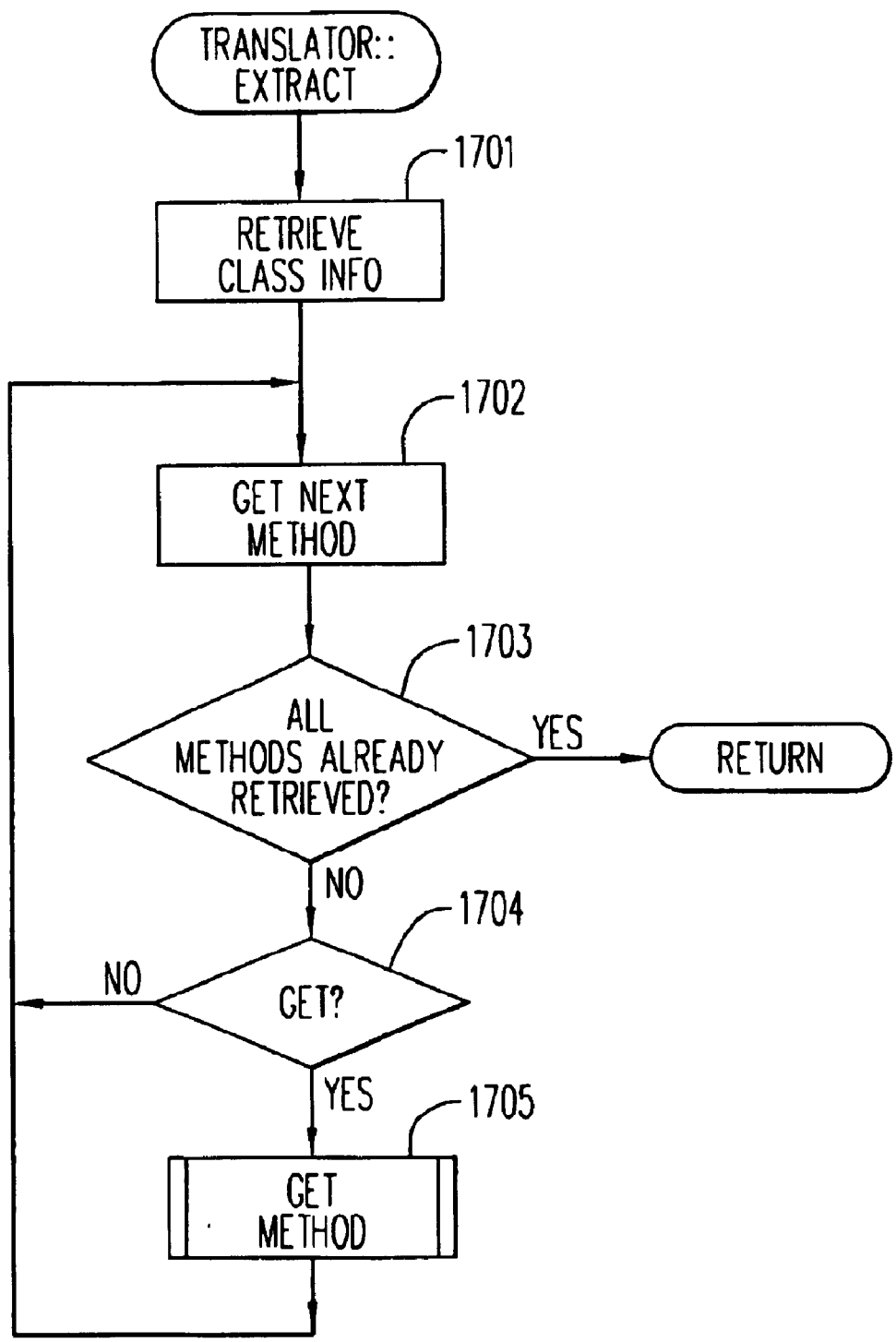
FIG. 17 is a flow diagram illustrating the processing of an extract component of the translator in one embodiment.

FIG. 17 is a flow diagram illustrating the processing of an extract component of the translator in one embodiment. The extract component retrieves the attribute values from the passed object and stores those values in the attribute store. In block 1701, the component retrieves the class definition for the passed object. In blocks 1702–1705, the function loops identifying the get methods of the object and extracting their attribute values. In block 1702, the component selects the next method of the class definition. In decision block 1703, if all the methods have already been selected, then the component returns, else the component continues at block 1704. In decision block 1704, if the selected method is a get method, then the component continues at block 1705, else the component loops to block 1702 to select the next method. In block 1705, the component invokes the get method component of the translator and then loops to block 1702 to select the next method.

Figure 18:
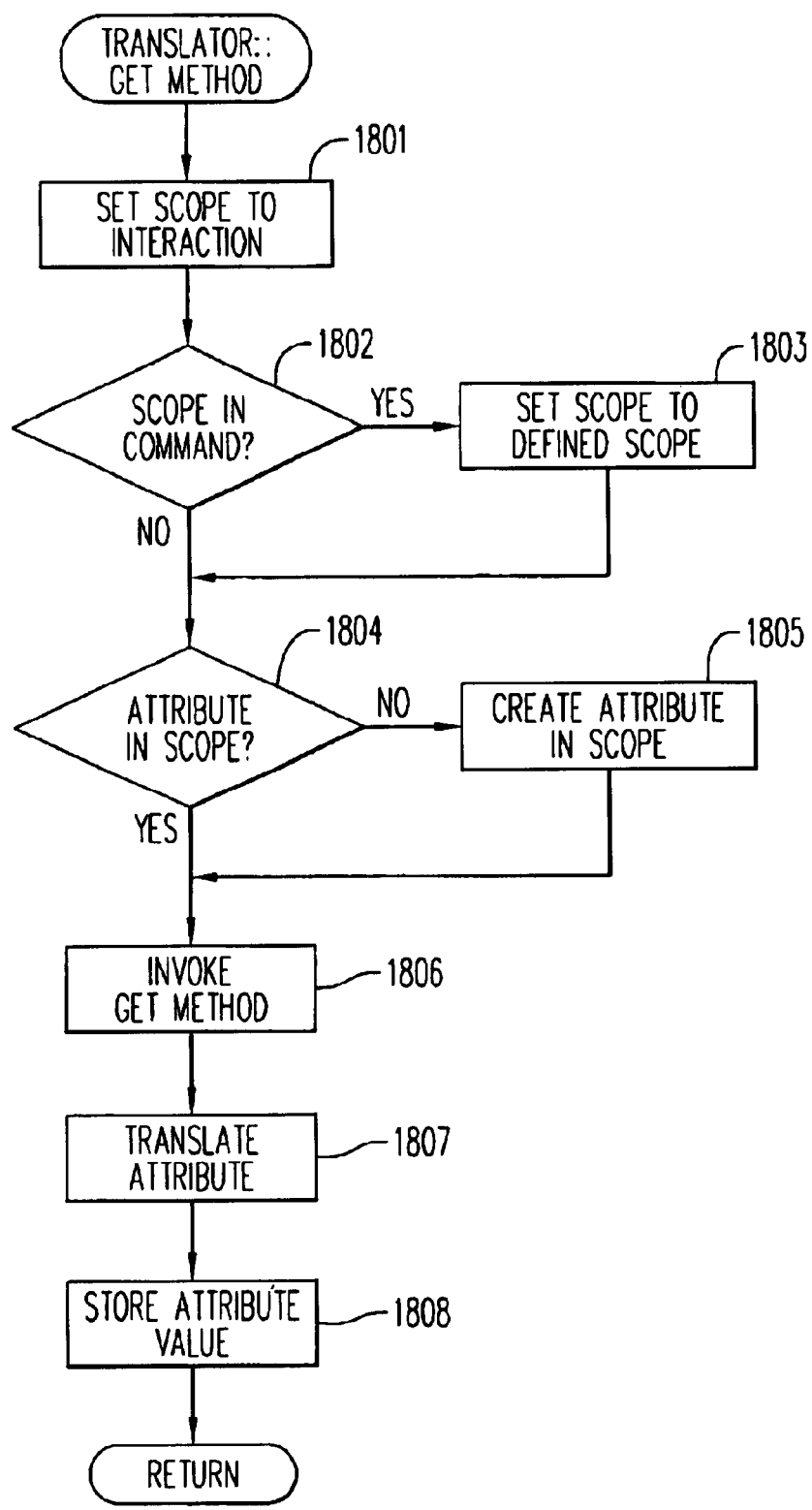
FIG. 18 is a flow diagram illustrating the processing of the get method component of the translator in one embodiment.

FIG. 18 is a flow diagram illustrating the processing of the get method component of the translator in one embodiment. This component stores the attribute value of the passed get method in the attribute store with the appropriate scope. In block 1801, the component sets the scope of the attribute associated with the selected method to the default scope (e.g., interaction). In decision block 1802, if the scope is specified in the command definition, then the component continues at block 1803, else the component continues at block 1804. In block 1803, the component sets the scope to the scope specified in the command definition. In decision block 1804, if the attribute store contains a value for the attribute of the passed get method for the specified scope, then the component continues at block 1806, else the component continues at block 1805. In block 1805, the component creates an attribute store entry for the attribute of the specified scope. In block 1806, the component invokes the get method of the object to retrieve the value of the attribute. In block 1807, the component translates the retrieved value of the attribute to the type needed by the attribute store. In block 1808, the component stores the value of the attribute in the attribute store with the specified scope and then returns.

From the above description, it will be appreciated that although specific embodiments of the execution system have been described for purposes of illustration, various modifications may be made without deviating from the scope of the invention. The execution system may be used in environments other than those based on the request-response model. For example, the execution system may be used in an event-based environment where interactions have commands but not views. Whenever an event is detected, the corresponding interaction is invoked to perform the processing (e.g., logging, setting off an alarm, and sending an electronic mail message) associated with that event. More generally, the behavior of any computer program can be implemented using an interaction-based application model that is executed by the execution system. Accordingly, the invention is not limited except by the following claims.

What is claimed is:

1. A method in a computer system for executing a program, the method comprising:

providing a plurality of definitions of interactions of the program, an interaction having one or more command definitions defining commands and a view definition, a command having input attributes and output attributes and a behavior, each interaction being associated with a request;

receiving a request;

identifying the interaction associated with the received request;

for each command of the identified interaction, preparing the command by setting values of input attributes of the command based on attribute values stored in an attribute store;

performing the behavior of the command with the input attributes; and extracting attribute values of the command by retrieving values of the output attributes of the command and storing the retrieved values of the attributes in the attribute store; and providing a response generated by the view associated with the identified interaction;

wherein the view definition defines a view with attributes and a behavior, the method further comprising:

setting values of input attributes of the view based on attribute values stored in an attribute store; and performing the behavior of the view with the set attributes.

2. The method of claim 1 including before performing the behavior of the commands, setting values of attributes defined in the received request.

3. The method of claim 1 including before performing the behavior of a command, validating the values of the input attributes of the command.

4. The method of claim 1 wherein a command definition defines a value of an attribute.

5. The method of claim 1 wherein a command definition defines a scope associated with an attribute.

6. The method of claim 1 wherein the command definition defines an object class and including instantiating an object of the object class before setting the values of the input attributes of the command.

7. The method of claim 6 wherein the object class defines a Java bean.

8. The method of claim 1 wherein the behavior of the view provides a display page.

9. The method of claim 1 wherein the view definition defines a view with a target and including invoking the target to generate a response.

10. The method of claim 9 wherein the response is a display page.

11. The method of claim 10 wherein the target is a Java server page.

12. The method of claim 10 wherein the target is an active server page.

13. The method of claim 1 wherein the definition of an interaction includes a conditional that specifies a view to execute based on the value of an attribute in the attribute store.

14. The method of claim 1 wherein the definition of an interaction includes a conditional that specifies a command whose behavior is to be performed based on the value of an attribute in the attribute store.

15. The method of claim 1 wherein a command definition specifies mapping between a name of an attribute stored in the attribute store and a name of an attribute of the command.

16. The method of claim 1 wherein a command definition indicates whether the behavior of the command should be performed when an error is detected while performing the behavior of the commands of the interaction.

17. The method of claim 1 including providing a translator for preparing commands and for extracting attributes from the commands.

18. The method of claim 1 wherein a command definition identifies a translator.

19. The method of claim 1 wherein a command definition provides a value for an attribute that is used in place of the value of that attribute stored in the attribute store.

20. A method in a computer system for generating source code for a program, the method comprising:

receiving a list of names of function to be invoked by the program;

for each of the functions to be invoked of the program, identifying names of formal parameters of the function; and outputting an invocation of the function that includes names of actual parameters derived from the identified names of formal parameters whereby the output invocations of the functions form the source code for the program.

21. The method of claim 20 wherein each function has a signature that includes the name of the function and type of each formal parameter.

22. The method of claim 20 wherein each function has an associated object and including outputting source code to instantiate the object for each function.

23. The method of claim 22 wherein the object has a set and get method for setting and getting values of parameters.

24. The method of claim 20 including receiving an alias for a name of a parameter.

25. A computer-readable medium containing a data structure defining a command-based program, the data structure including:

for commands of the program, a descriptor for the command, the descriptor identifying an object class, the object class defining input and output attributes and having a perform method whereby the program is executed by instantiating objects corresponding to the object classes of the commands, setting input attribute values of objects based on output attribute values of objects, and performing the perform method of the objects;

wherein the commands are organized into interactions, one of the interactions including a first object class to retrieve a current application context of the application, a second object class to begin a transaction for an asset catalog, a third object class to identify a value of attributes of an asset to be added to the asset catalog, a fourth object class to store an entry identified by a created object in the asset catalog, and a fifth object class to indicate that the transaction is ending.

26. The computer-readable medium of claim 25 wherein each interaction has a name.

27. The computer-readable medium of claim 25 wherein the program operates in a request-response environment and a request specifies an interaction whose commands are to be performed.

28. The computer-readable medium of claim 27 wherein each interaction has an associated view that specifies a response to be provided.

29. The computer-readable medium of claim 28 wherein an interaction has a condition for selection of a view.

30. The computer-readable medium of claim 25 wherein the descriptor further identifies an alias for an attribute of a command.

31. The computer-readable medium of claim 25 wherein the descriptor further identifies a constant for an attribute of a command.

32. The computer-readable medium of claim 25 wherein the descriptor further identifies whether the command should be performed when an error is detected during execution of other commands of the program.

* * * * *